(12) United States Patent
Moore et al.

(10) Patent No.: US 6,694,508 B1
(45) Date of Patent: *Feb. 17, 2004

(54) METHOD FOR SYNCHRONIZING UML WITH JAVA IN A VERSION CONFIGURATION MANAGEMENT SYSTEM

(75) Inventors: Jeffrey Allen Moore, Mission Viejo, CA (US); Joseph Peter Stefaniak, San Clemente, CA (US); Lonnie Dale Sulgrove, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 574 days.

This patent is subject to a terminal disclaimer.

(21) Appl. No.: 09/676,284

(22) Filed: Sep. 28, 2000

(51) Int. Cl.[7] .................................................. G06F 9/44
(52) U.S. Cl. .................. 717/121; 717/106; 717/108; 717/116; 717/118; 717/122; 707/1; 707/103 Y
(58) Field of Search ................................. 717/101, 102, 717/106, 108, 118, 116, 121, 122; 707/1, 3, 10, 103 Y (56) References Cited

U.S. PATENT DOCUMENTS

| | | |
|---|---|---|
| 5,557,793 A | 9/1996 | Koerber |
| 5,581,755 A | 12/1996 | Koerber et al. |
| 5,644,766 A | 7/1997 | Coy et al. |
| 5,671,398 A | 9/1997 | Neubauer |
| 5,701,472 A | 12/1997 | Koerber et al. |
| 5,721,925 A | 2/1998 | Cheng et al. |
| 5,758,348 A | 5/1998 | Neubauer |
| 5,765,039 A | 6/1998 | Johnson et al. |
| 5,848,273 A | 12/1998 | Fontana et al. |
| 5,889,992 A | 3/1999 | Koerber |

(List continued on next page.)

OTHER PUBLICATIONS

Title: Visualizing the Synchronization of Java–Threads with UML, author: Mehner et al, IEEE, 2000.*
Title: Round trip engineering with design patterns, UML, Java and C++ author: Wilhelm Schäfer, Albert Zündorf, May 1999, ACM.*
Title: A tool for designing Java programs with UML, author: Anna Armentrout, Jun. 1999, ACM.*
Title: Integrating UML diagrams for production control systems , Authors: Hans J. Köhler et al, ACM, Jun., 2000.*
Title: Code Generated for Supporting Associations between EJBs at EJB Creation Time, IBM technical Disclosure Bulletin, Jan. 2000.*
Title: Universal Code Generator Based on Templates and Design Models, IBM technical Disclosure Bulletin, Oct. 1999.*
Title: Managing the software design documents with XML , Authors: Suzuki et al, ACM, 1998.*

*Primary Examiner*—Chameli Chaudhuri Das
(74) *Attorney, Agent, or Firm*—Phuong-Quan Hoang; Lise A Rode; Mark T. Starr (57) ABSTRACT

A computer implemented-method for synchronizing JAVA in a UML in a computer system executing a repository program. The method comprises the steps of determining if a previous revision of UML representation exist, and if not; creating a new revision thereof. Next, the new revision is put in a "created" state and stored in a new UML representation in the UML revision. The UML revision is then put in a "ready" state. After this, a determination is made as to whether or not there are more UML classes/interfaces; and if there are, a JAVA revision ID is extracted from the UML class/interface. Another determination is made as to whether or not a JAVA revision exist, and if not; a new revision of JAVA source is created and put into a "created" state. JAVA source is then generated from a UML representation and stored in the new revision and put into a "ready" state. All of the steps are repeated until there are no more UML classes/interfaces.

8 Claims, 5 Drawing Sheets

U.S. PATENT DOCUMENTS

| | | |
|---|---|---|
| 5,903,720 A | 5/1999 | Stokes |
| 6,105,073 A | 8/2000 | Choung |
| 6,199,195 B1 * | 3/2001 | Goodwin et al. ............ 717/104 |
| 6,256,773 B1 * | 7/2001 | Bowman-Amuah ......... 717/121 |
| 6,269,473 B1 * | 7/2001 | Freed et al. ................. 717/104 |
| 6,332,163 B1 * | 12/2001 | Bowman-Amuah ......... 709/231 |
| 6,339,832 B1 * | 1/2002 | Bowman-Amuah .......... 714/35 |
| 6,349,404 B1 * | 2/2002 | Moore et al. ................ 717/104 |
| 6,370,573 B1 * | 4/2002 | Bowman-Amuah ......... 709/223 |
| 6,405,364 B1 * | 6/2002 | Bowman-Amuah ......... 717/101 |
| 6,421,821 B1 * | 7/2002 | Lavallee ..................... 717/109 |
| 6,523,027 B1 * | 2/2003 | Underwood ................... 707/4 |
| 6,529,909 B1 * | 3/2003 | Bowman-Amuah .......... 707/10 |

* cited by examiner

METHOD FOR SYNCHRONIZING UML WITH JAVA IN A VERSION CONFIGURATION MANAGEMENT SYSTEM

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS REFERENCE TO RELATED PATENT APPLICATIONS

This application relates to the following co-pending applications, assigned to the same assignee hereof, which is incorporated herein by reference.

{1114} U.S. Ser. No. 09/676,286 entitled A COMPUTER-IMPLEMENTED METHOD FOR REPRESENTING JAVA USING UML COMPLIANT TOOLS;

{1115} U.S. Ser. No. 09/676,289 entitled A METHOD FOR SYNCHRONIZING JAVA WITH UML IN A VERSION CONFIGURATION MANAGEMENT SYSTEM; and, {1119} U.S. Ser. No. 09/676,288 entitled A COMPUTER-IMPLEMENTED METHOD FOR GENERATING JAVA FROM A UML REPRESENTATION.

FIELD OF THE INVENTION

The present invention generally relates to computer-implemented processes and in particular to a process that synchronizes UML with JAVA in a version configuration management system.

BACKGROUND OF THE INVENTION

A problem arises when using the method disclosed in the above-referenced co-pending patent application, which allows for the translation and generation of JAVA files into UML, and vice-versa. JAVA is a programming language, which was developed by Sun Microsystems, Inc. of Mountain View, Calif.

When JAVA files are translated to form XMI representations of UML at the class, package, and project levels, the user must deal with multiple file representations of the same object. For instance, a project containing five packages, where each package contains five class files adds to a total of thirty-one files (one project, five package, and twenty-five class files).

As JAVA files generate UML representations, and UML Models are transformed into JAVA files, there is a need to synchronize all of the associations between the files.

Traceability for application assembly is another problem to be solved. Application assembly allows various projects to share assets with one another. Hence, the ability to track down how projects share files with one another is critical.

SUMMARY OF THE INVENTION

The product addresses this need by using versioning. First, the product implements the Unisys Version and Configuration System (VCS) to version both JAVA code and XMI.

Next, the product implements a JAVA parser/generator and XMI parser/generator to provide forward and reverse engineering between JAVA code and XMI.

The product then associates JAVA code and XMI at the class, package, and project levels using VCS. A soft-link association is created between each JAVA and UML file pair.

In order to support tracing for application assembly, link associations are also created between various projects. These links are used for versioning and allow for traceability between the projects.

A feature of the present invention resides in the ability to perform round trip engineering between UML and JAVA.

Another feature of the present invention resides in the ability to synchronize JAVA and UML with finer granularity, by creating links between JAVA files and UML objects at the class, package, and project levels.

Still another feature of the present invention resides in traceability between projects.

An advantage of the present invention is the use of versioning to provide traceability.

These and other objects, which will become apparent as the invention is described in detail below, are provided by a computer implemented-method for synchronizing JAVA in a UML in a computer system executing a repository program. The method comprises the steps of determining if a previous revision of UML representation exist, and if not; creating a new revision thereof. Next, the new revision is put in a "created" state and stored in a new UML representation in the UML revision. The UML revision is then put in a "ready" state. After this, a determination is made as to whether or not there are more UML classes/interfaces; and if there are, a JAVA revision ID is extracted from the UML class/interface. Another determination is made as to whether or not a JAVA revision exist, and if not; a new revision of JAVA source is created and put into a "created" state. JAVA source is then generated from a UML representation and stored in the new revision and put into a "ready" state. All of the steps are repeated until there are no more UML classes/interfaces.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
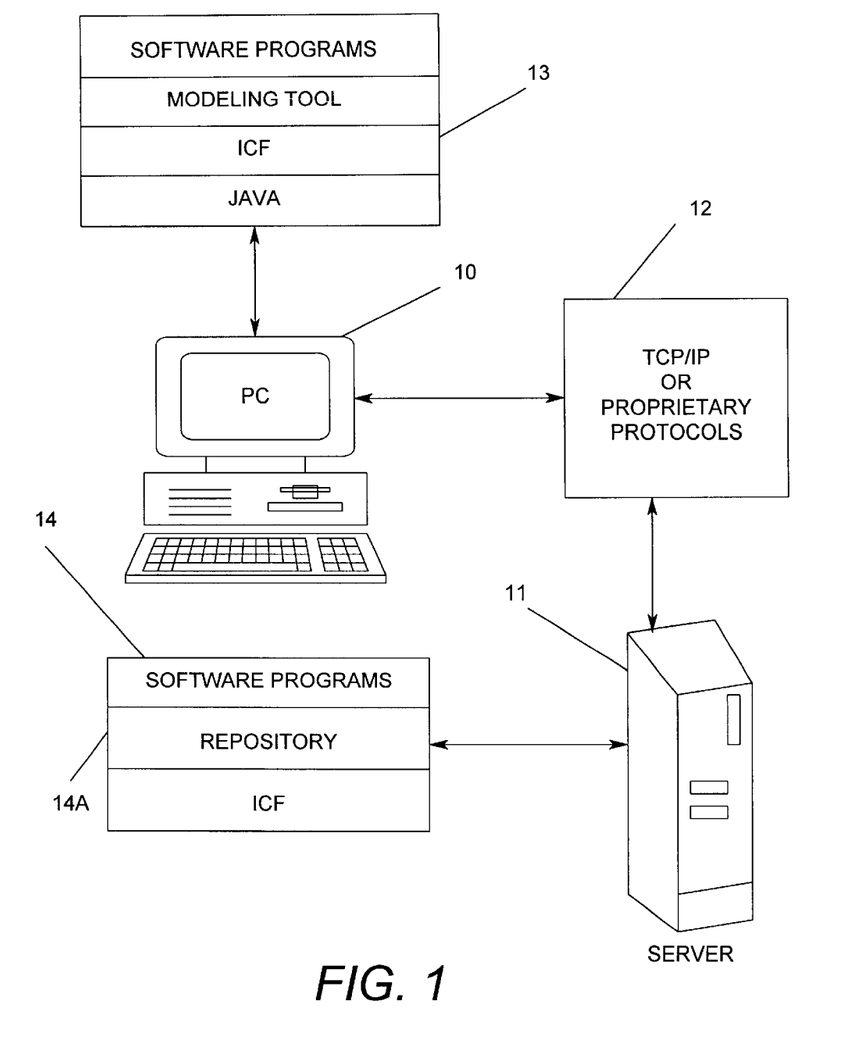
FIG. 1 is a block diagram of a system that may execute the method of the present invention.

Referring now to the drawings and FIG. 1 in particular, a block diagram of a system that may implement the process of the present invention is shown. Either a single computer 10 or a combination of the computer 10 and a server 11, which is shown coupled to the computer 10 by means of a TCP/IP or proprietary protocol 12, would be satisfactory for executing the process of the present invention. In the illustrated embodiment shown in FIG. 1, the computer 10 would typically be executing a variety of software 13, including Rational Rose, Unisys Integrated Component Framework (ICF) and JAVA development software. The server 11 in the illustrated embodiment is a server, which is capable of executing the NT operating system available from Microsoft Corporation of Redmond, WA. The server 11 also executes a variety of software programs 14, including ICF, which is a framework that integrates third-party tools to provide full life-cycle model to deployment operation and management of components and a repository program 14A.

The repository 14A further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U. S. Pat. No. 5,889,992 for A METHOD FOR MAPPING TYPES IN A MODEL IN AN OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; and U.S. Pat. No. 6,105,073, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

The XMI protocol is further described in co-pending applications Ser. No. 09/282,345, filed Mar. 31, 1999, for A METHOD AND SYSTEM FOR GENERATING A SIMPLE DOCUMENT TYPE DEFINITION FOR DATA INTERCHANGE AMONG SOFTWARE TOOLS; Ser. No. 09/282,102, filed Mar. 31, 1999, for A METHOD AND SYSTEM FOR GENERATING A COMPACT DOCUMENT TYPE DEFINITION FOR DATA INTERCHANGE AMONG SOFTWARE TOOLS; Ser. No. 09/282,230, filed Mar. 31, 1999 for A METHOD AND SYSTEM FOR GENERATING A HIERARCHIAL DOCUMENT TYPE DEFINITION FOR DATA INTERCHANGE AMONG SOFTWARE TOOLS; Ser. No. 09/345,289, filed Jun. 30, 1999, for A METADATA DRIVEN SYSTEM AND METHOD FOR EFFECTING DATA INTERCHANGE AMONG SOFTWARE TOOLS IN A DISTRIBUTED ENVIRONMENT; Ser. No. 09/345,290, filed Jun. 30, 1999, for METHOD FOR IDENTIFYING UML OBJECTS IN A REPOSITORY WITH OBJECTS IN XML CONTENT; Ser. No. 09/322,137, filed May 28, 1999, for A SYSTEM AND METHOD FOR CONVERTING FROM ONE MODELING LANGUAGE TO ANOTHER; Ser. No. 09/345,291, filed Jun. 30, 1999, for A METHOD FOR VERSIONING A UML MODEL IN A REPOSITORY IN ACCORDANCE WITH AN UPDATED XML REPRESENTATION OF THE UML MODEL.

Figure 2:
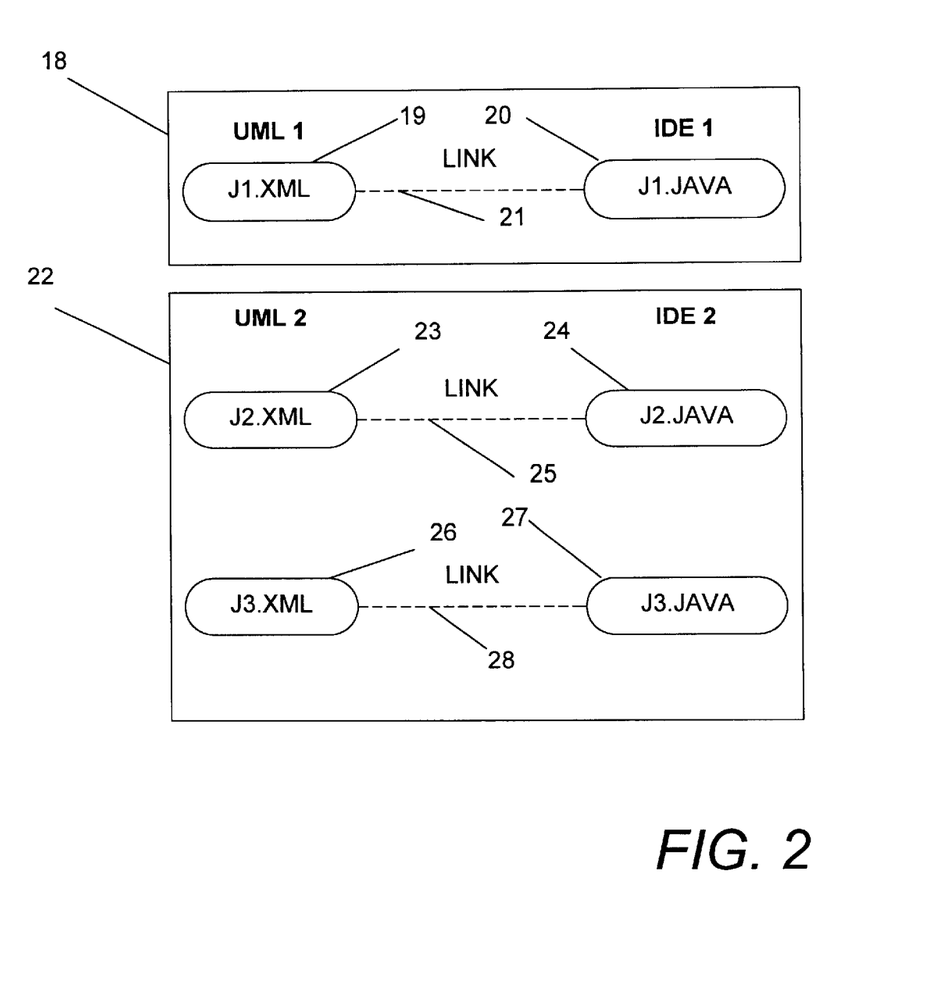
FIG. 2 is a diagram illustrating the links made between JAVA and UML by the method of the present invention.

Referring now to FIG. 2, a diagram illustrating the traceability feature obtained by using the method of the present invention is shown. A first JAVA development environment 18 is shown containing only two exemplary files 19 and 20. In the illustrated example file 19, which is a UML representation J1.XML, is linked by means of a Link 21, which link is established by use of the method of the present invention, to the file 20, which is a JAVA representation J1.JAVA. In a second JAVA development environment 22, a UML file 23 (J2.XML) is linked to a JAVA file 24 (J2.JAVA) by means of a link 25; and, in a similar manner, a UML file 26 (J3.XML) is linked to a JAVA file 27 (J3.JAVA) by means of a link 28. It is pointed out that the JAVA development environment 18 may be run on one PC coupled to the server 11 in the same manner as PC 10 (FIG. 1) and the JAVA development environment 22 may be run at the same time on a separate PC, also coupled to the server 11 in a similar manner.

It is important to establish the links between the UML objects and the JAVA files, which is performed by the method of the present invention, in order to synchronize UML and JAVA and to allow traceability. During the life cycle of development of a model to the final deployment, it is desirable for a developer to have the capability to trace the history of a model. This is accomplished by synchronizing between each stage of the life cycle of development. For example, from the model to code generation, a synchronization is established. Next, from the code generation to publication a similar synchronization is established. And, between the publication and deployment another synchronization is established. By doing this, then a developer may trace from the deployment stage all the way back to the model stage and vice versa.

Figure 3:
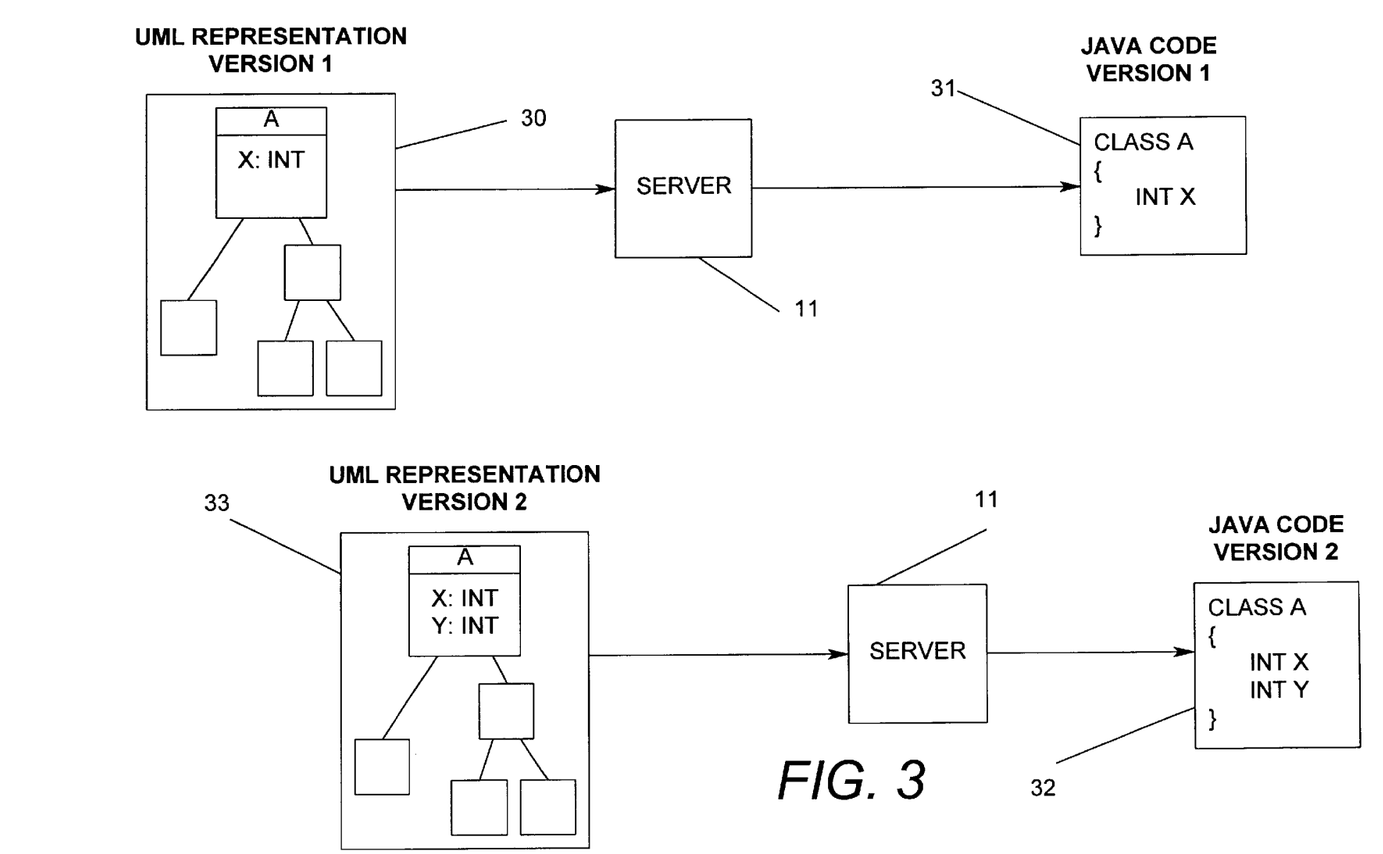
FIG. 3 is a diagram illustrating the internal relationships between the JAVA objects and the UML diagrams FIGS. 4A and 4B combined form a flow chart of the process for synchronizing UML to JAVA in accordance with the present invention.

Referring now to FIG. 3, a diagram illustrating the internal relationships between the JAVA objects (e.g., object 30) and the UML diagrams is shown. A UML representation version 1 of a class A (reference number 30) is moved through the server 11 and converted by the method of the present invention to a JAVA code, version 1 (reference number 31). Details of this process flow are shown in FIG. 4 and described further hereinafter.

In a similar manner, a second version of the UML representation class A (reference number 33) is converted by the method of the present invention operating in the server 11 to a JAVA code 32, which is still version 2 of the class A.

In this example, UML representation class A is revised from version 1 (reference number 30) to version 2 (reference number 33). The second version of the UML representation class A (reference 33) contains the additional class member INT Y. Because a difference in the UML representation exists, a new JAVA source 32 is created by the present invention, thus synchronizing associations between JAVA and UML. This process is further detailed in FIG. 4.

Figure 4A:
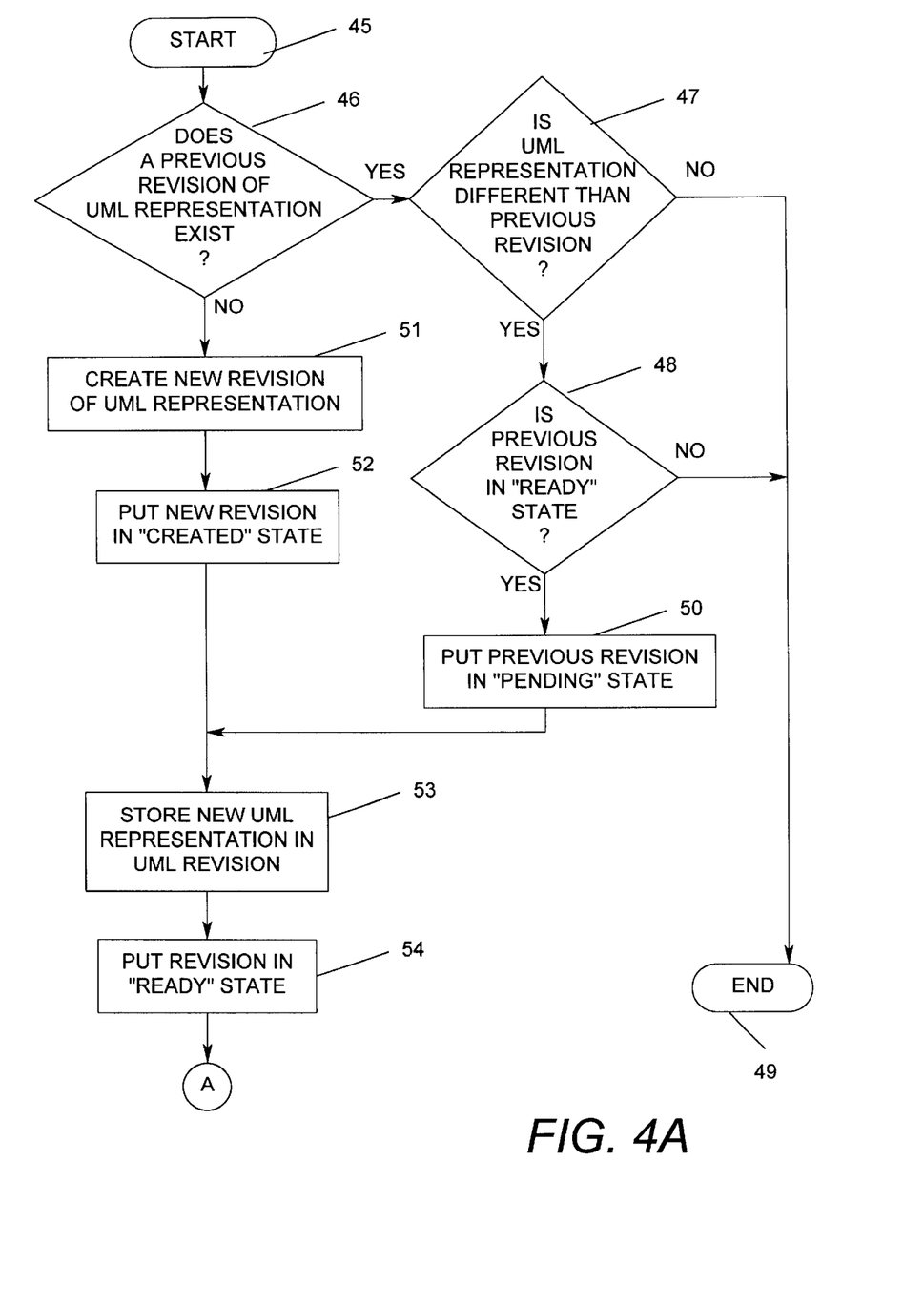
Figure 4B:
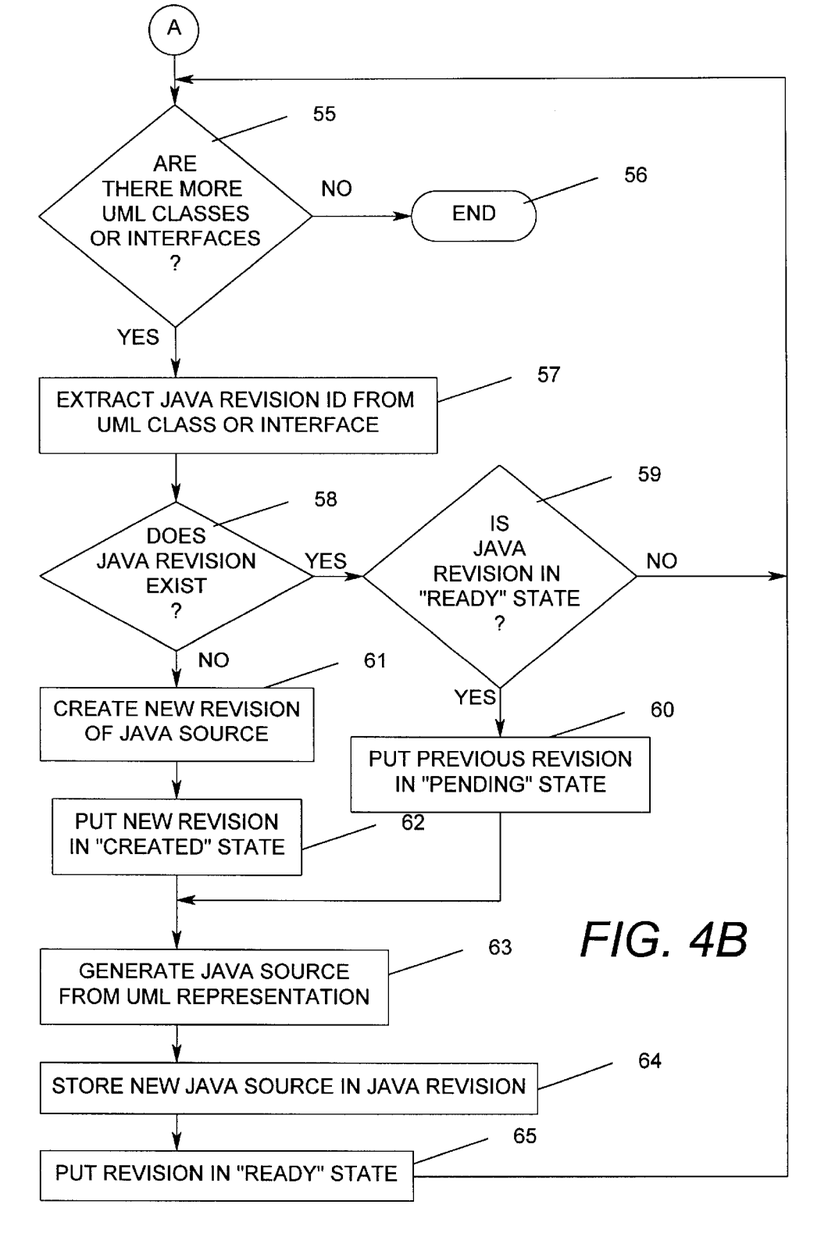

Referring now to FIGS. 4A and 4B wherein a flow chart of the process for synchronizing UML to JAVA is shown. The process begins with a start bubble 45 followed by an inquiry as to whether or not a previous revision of UML representation exist (diamond 46). If the answer to this inquiry is yes, then another inquiry is made as to whether or not UML is different than the previous revision (diamond 47. If the answer to this inquiry is yes, then yet another inquiry is made as to whether or not the previous revision is in a "ready" state (diamond 48). If the answer to either of the inquiries depicted by the diamond 47 or 48 is no, then the process ends (bubble 49). On the other hand, if the answer to the inquiry depicted by the diamond 48 is yes, then the previous revision is put in a "pending" state (block 50).

On the other hand, if the answer to the inquiry depicted by the diamond 46 is no, then a new revision of the UML representation is created (block 51). The new revision is then put in a "created" state (block 52). Upon completion of the step depicted by the block 52 or the block 50, the UML representation is then stored in UML revision (block 53). Next, this revision is put in a "ready" state (block 54). Upon completion of the step depicted by the block 54, the process illustration continues on the next sheet of the drawings in FIG. 4B as denoted by a connector A.

Referring now to FIG. 4B at the connector A, another inquiry is made as to whether or not there are more UML classes or interfaces (diamond 55). If the answer to this inquiry is no, then the process ends (bubble 56). On the other hand, if the answer is yes, then the JAVA revision ID is extracted from UML class or interface (block 57). Next, another inquiry is made as to whether or not a JAVA revision exists (diamond 58). If the answer to this inquiry is yes, then yet another inquiry is made as to whether or not JAVA is in a "ready" state (diamond 59). If the answer to this inquiry is no, then a return is made back to the diamond 55. On the other hand, if the answer to this inquiry is yes, then the previous revision is put in a "pending" state (block 60).

If the answer to the inquiry depicted by the diamond 58 is no, then the new revision of the JAVA source is created (block 61). Next, this new revision is put in a "created" state (block 62). Upon completion of the step depicted by the block 60 or 62, then the JAVA source is generated from UML representation (block 63). After this, the new JAVA source is stored in the new JAVA revision (block 64) and the revision is put in a "ready" state (block 65). Upon completion of the step depicted by the block 65, a return is made back to the diamond 55.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a repository program, a computer-implemented method for synchronizing UML with JAVA in a version configuration management system, said method comprising the steps of:

a. determining if a previous revision of UML representation exist, and if not;

b. creating a new revision of a UML representation;

c. putting said new revision in a "created" state;

d. storing new UML representation in said UML revision;

e. putting said UML revision in a "ready" state;

f. determining if there are more UML classes/interfaces, and if so;

g. extracting JAVA revision ID from UML class/interface;

h. determining if JAVA revision exist, and if not;

i. creating a new revision of JAVA source and putting said new revision in a "created" state;

j. generating JAVA source from UML representation;

k. storing new JAVA source in JAVA revision and putting it in a "ready" state; and, l. repeating all of the steps f through k until there are no more UML classes/interfaces.

2. The method as in claim 1 wherein it is determined that a previous revision of UML representation does exist, further comprising the steps of:

a. determining if UML representation is different than previous revision, and if so;

b. determining if said previous revision is in a "steady" state, and if so;

c. putting said previous revision in a "pending" state.

3. The method as in claim 1 wherein it is determined that a JAVA revision exist, further comprising the steps of:

a. determining if said JAVA revision is in a "ready" state, and if so;

b. putting said previous revision in a "pending" state.

4. The method as in claim 3 wherein it is determined that said JAVA revision is not in a "ready" state, further comprising the step of returning to the step of determining if there are more UML classes/interfaces.

5. A storage medium encoded with machine-readable computer program code for synchronizing UML with JAVA in a version configuration management system, wherein, when the computer program code is executed by a computer, the computer performs the steps of:

a. determining if a previous revision of UML representation exist, and if not;

b. creating a new revision of a UML representation;

c. putting said new revision in a "created" state;

d. storing new UML representation in said UML revision;

e. putting said UML revision in a "ready" state;

f. determining if there are more UML classes/interfaces, and if so;

g. extracting JAVA revision ID from UML class/interface;

h. determining if JAVA revision exist, and if not;

i. creating a new revision of JAVA source and putting said new revision in a "created" state;

j. generating JAVA source from UML representation;

k. storing new JAVA source in JAVA revision and putting it in a "ready" state; and, l. repeating all of the steps f through k until there are no more UML classes/interfaces.

6. The storage medium as in claim 5 wherein it is determined that a previous revision of UML representation does exist, further comprising the steps of:

a. determining if UML representation is different than previous revision, and if so;

b. determining if said previous revision is in a "steady" state, and if so;

c. putting said previous revision in a "pending" state.

7. The storage medium as in claim 5 wherein it is determined that a JAVA revision exist, further comprising the steps of:

a. determining if said JAVA revision is in a "ready" state, and if so;

b. putting said previous revision in a "pending" state.

8. The storage medium as in claim 7 wherein it is determined that said JAVA revision is not in a "ready" state, further comprising the step of returning to the step of determining if there are more UML classes/interfaces.

* * * * *